No. 880,858. PATENTED MAR. 3, 1908.
C. L. BOND.
ELECTRO AUTOMATIC WEIGHING APPARATUS.
APPLICATION FILED JAN. 28, 1907.
7 SHEETS—SHEET 1.
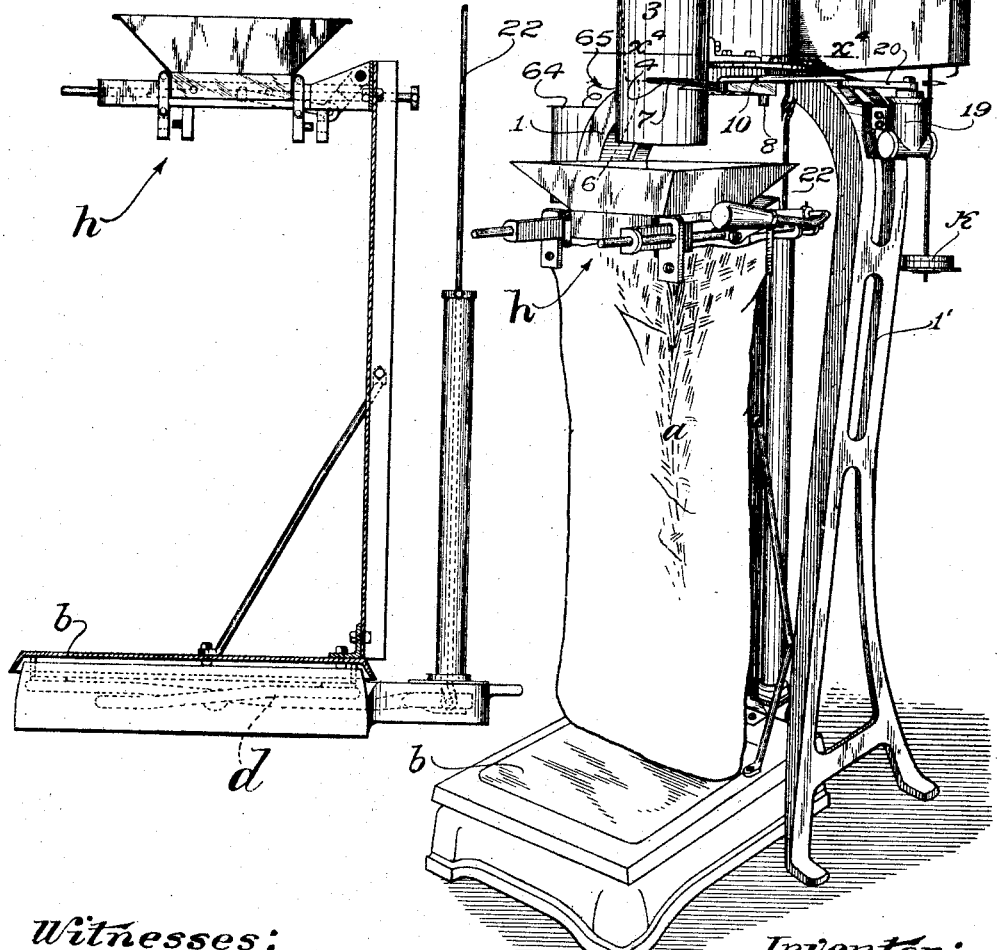
Witnesses:
F. N. Kirby.
M. B. Townsend.
Inventor:
Charles L. Bond
by James R. Townsend
his atty No. 880,858. PATENTED MAR. 3, 1908.
C. L. BOND.
ELECTRO AUTOMATIC WEIGHING APPARATUS.
APPLICATION FILED JAN. 28, 1907.

7 SHEETS—SHEET 2.

Witnesses:
F. N. Kubby
M. B. Townsend

Inventor:
Charles L. Bond
by James P. Townsend
his atty.

No. 880,858. PATENTED MAR. 3, 1908.
C. L. BOND.
ELECTRO AUTOMATIC WEIGHING APPARATUS.
APPLICATION FILED JAN. 28, 1907.

7 SHEETS—SHEET 3.

Witnesses:
Inventor,
Charles L. Bond
by James R. Townsend
his atty.

No. 880,858. PATENTED MAR. 3, 1908.
C. L. BOND.
ELECTRO AUTOMATIC WEIGHING APPARATUS.
APPLICATION FILED JAN. 28, 1907.
7 SHEETS—SHEET 4.
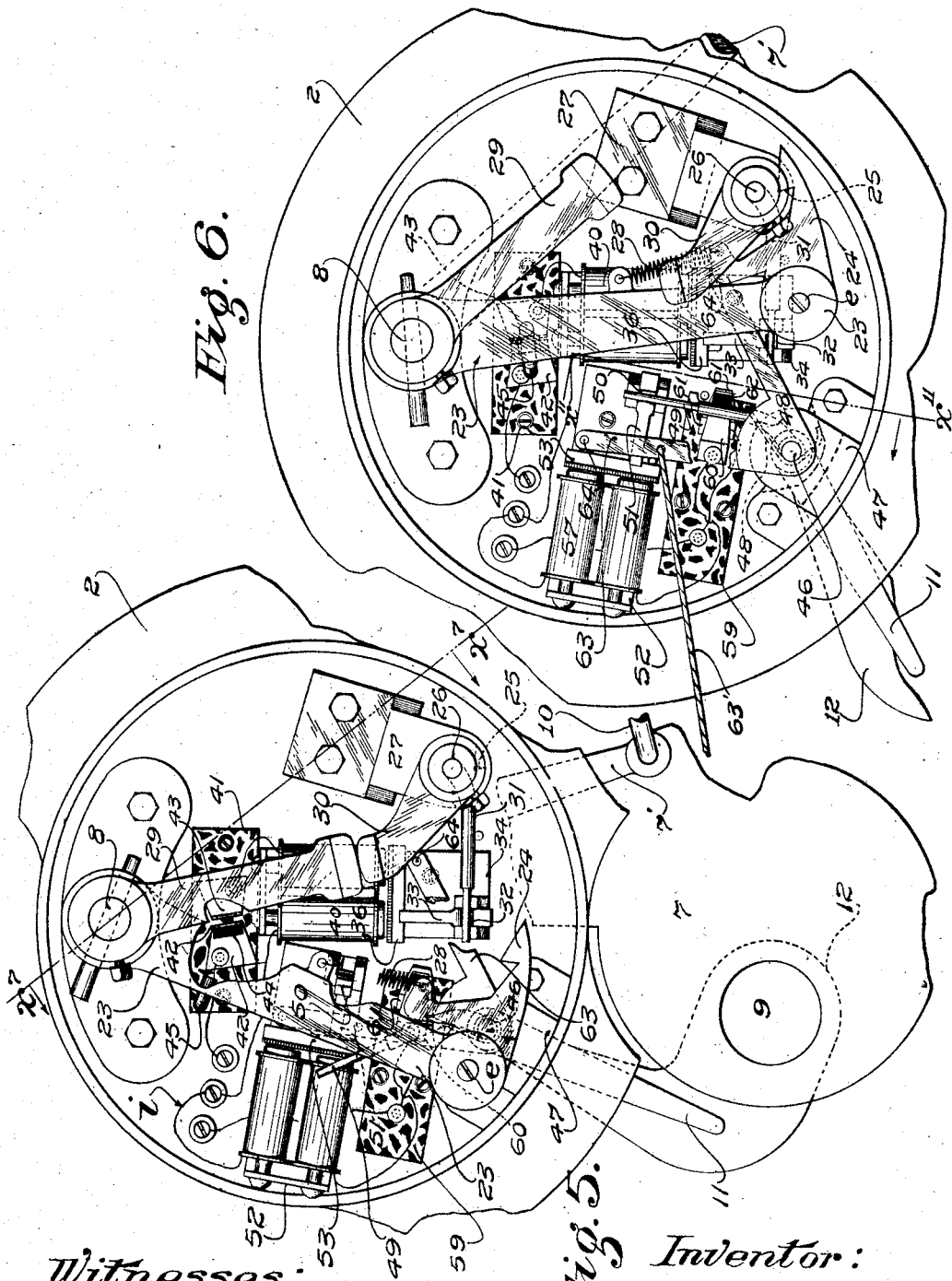
Witnesses:
F. N. Kirby.
M. B. Townsend.
Inventor:
Charles L. Bond
by James R. Townsend
his atty

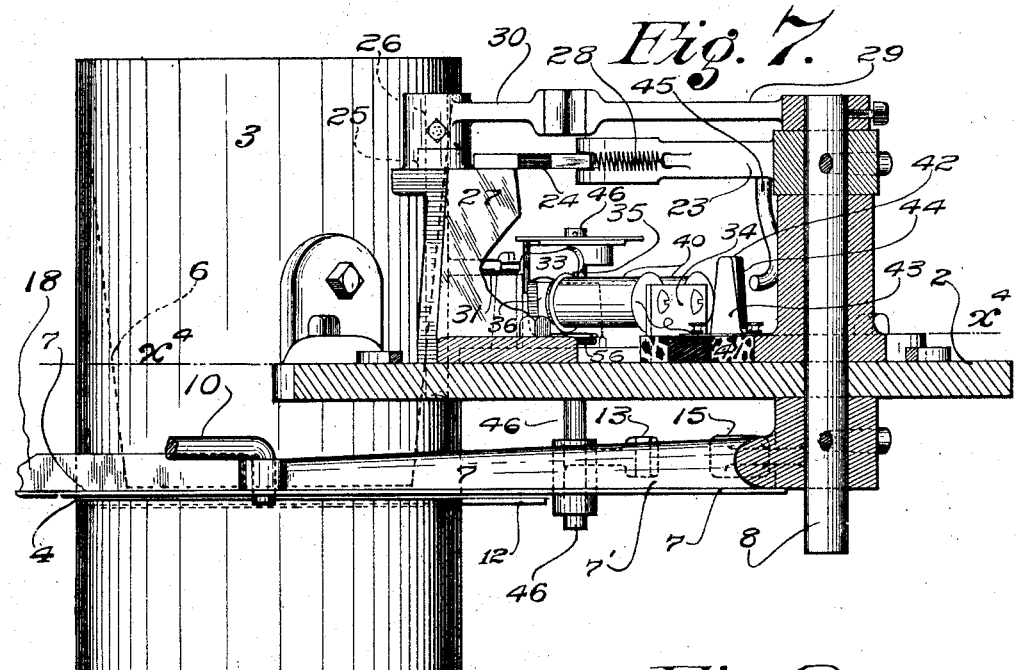
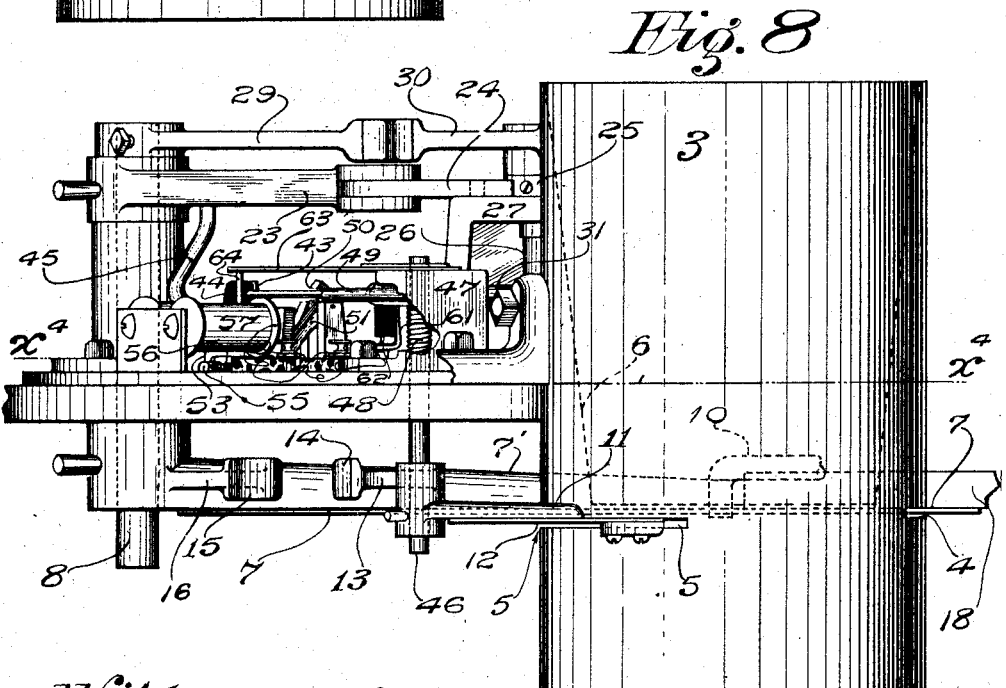

No. 880,858.
PATENTED MAR. 3, 1908.
C. L. BOND.
ELECTRO AUTOMATIC WEIGHING APPARATUS.
APPLICATION FILED JAN. 28, 1907.
7 SHEETS—SHEET 6.
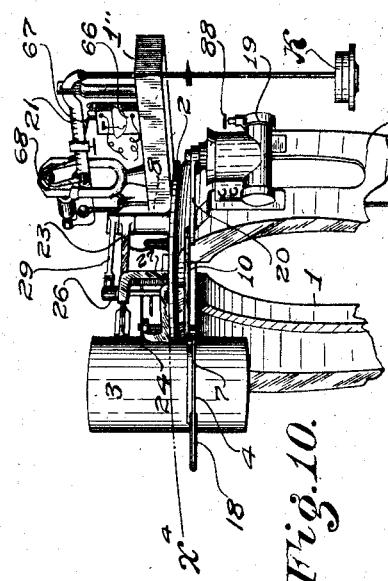
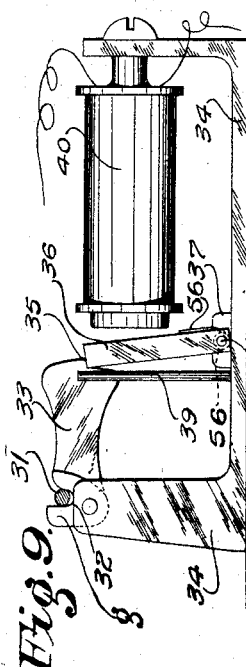
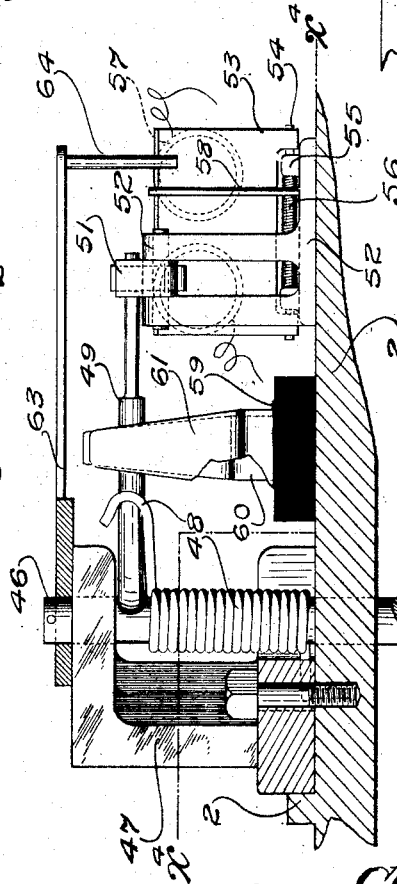
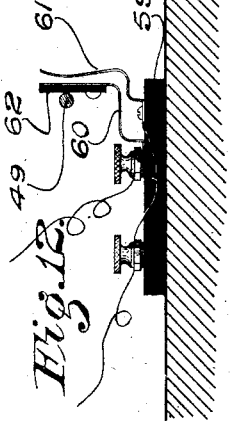
Witnesses:
Inventor:
Charles L. Bond
by James R. Townsend
his atty.

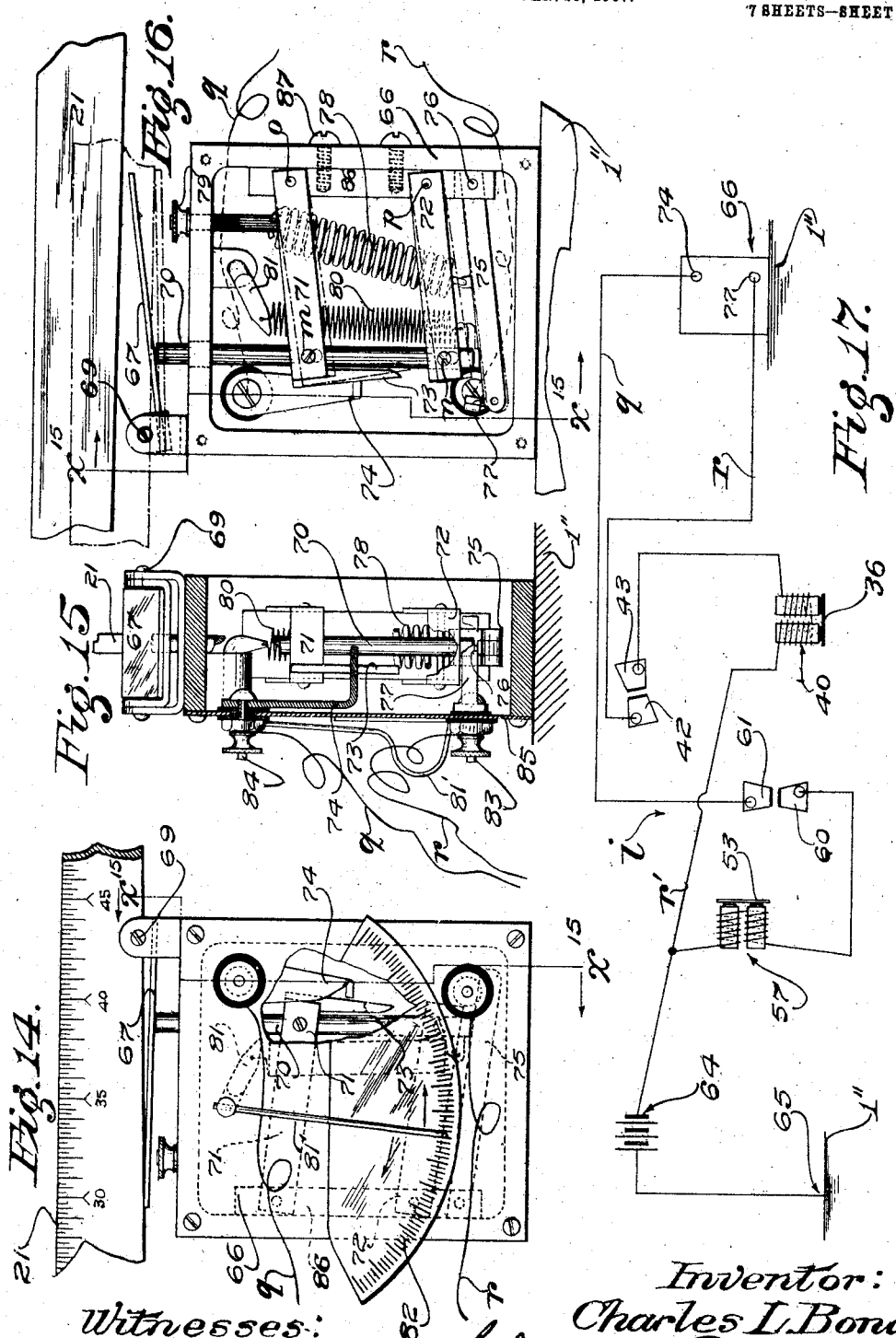

UNITED STATES PATENT OFFICE.

CHARLES L. BOND, OF LOS ANGELES, CALIFORNIA.

ELECTRO-AUTOMATIC WEIGHING APPARATUS.

No. 880,858.　　　　Specification of Letters Patent.　　　Patented March 3, 1908.

Application filed January 28, 1907. Serial No. 354,579.

*To all whom it may concern:*

Be it known that I, CHARLES L. BOND, a citizen of the United States, residing at Los Angeles, in the county of Los Angeles and State of California, have invented a new and useful Electro-Automatic Weighing Apparatus, of which the following is a specification.

This invention relates to that class of weighing machines in which the substance to be weighed passes by gravity from a bin or other receptacle where it is in bulk to a receptacle on the scales and in which a predetermined weight of material on the scale will cause the flow to be cut off.

It is of the objects of this invention to provide an automatic weighing machine of superior accuracy; to make said machine readily adjustable for accurately weighing substances of various characters, specific gravities and cohesive qualities; to eliminate inaccuracy arising from the momentum of the falling material; to provide for accurately weighing damp sugar and other cohesive substances as well as rice and other freely-flowing materials; to give the attendant complete control over the machine; to provide convenient means for setting the machine for each weighing; to avoid wear,— to avoid looseness and to secure durability.

Other objects and advantages may appear from the subjoined detailed description.

Figure 3:
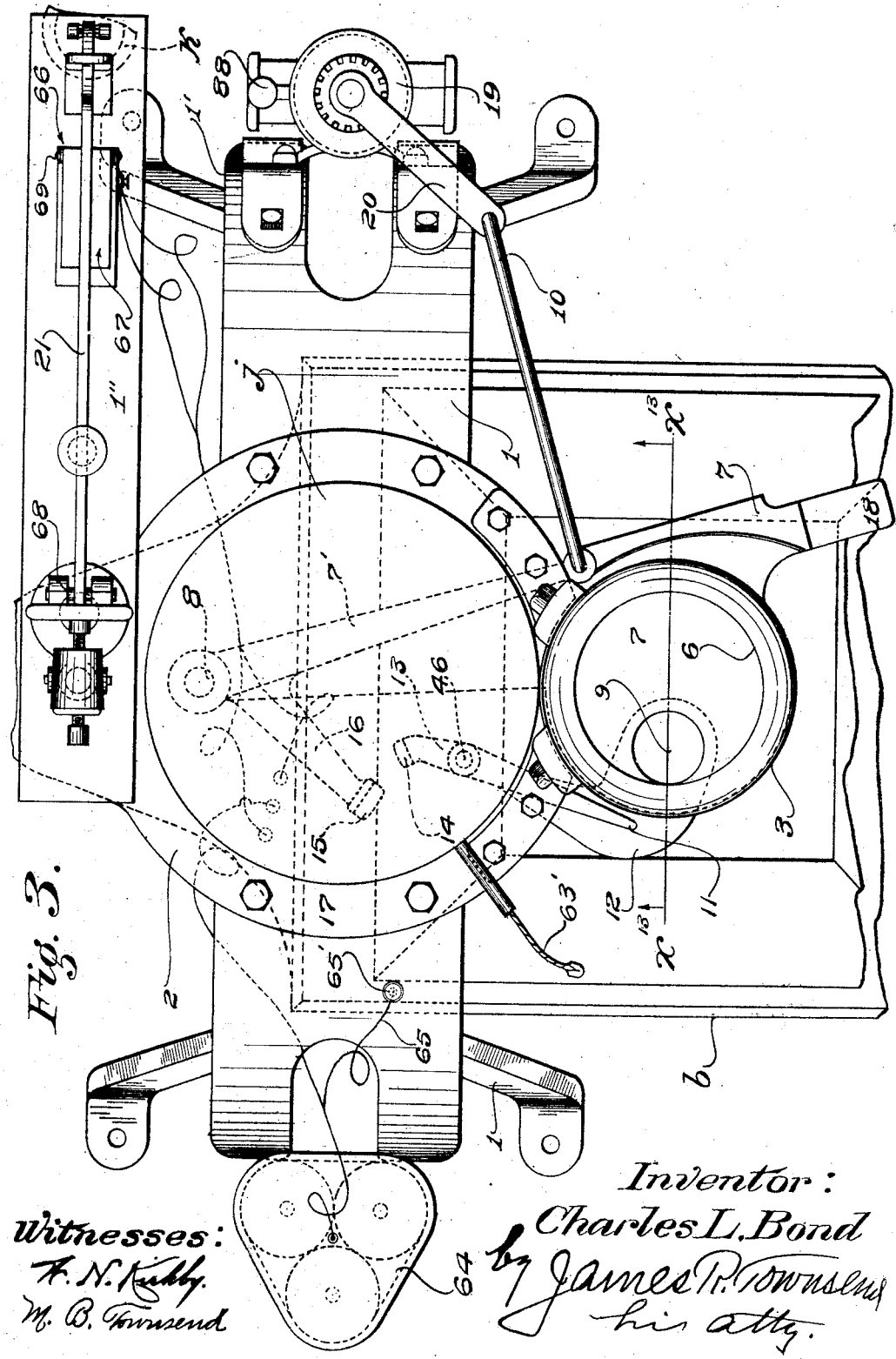
Figure 4:
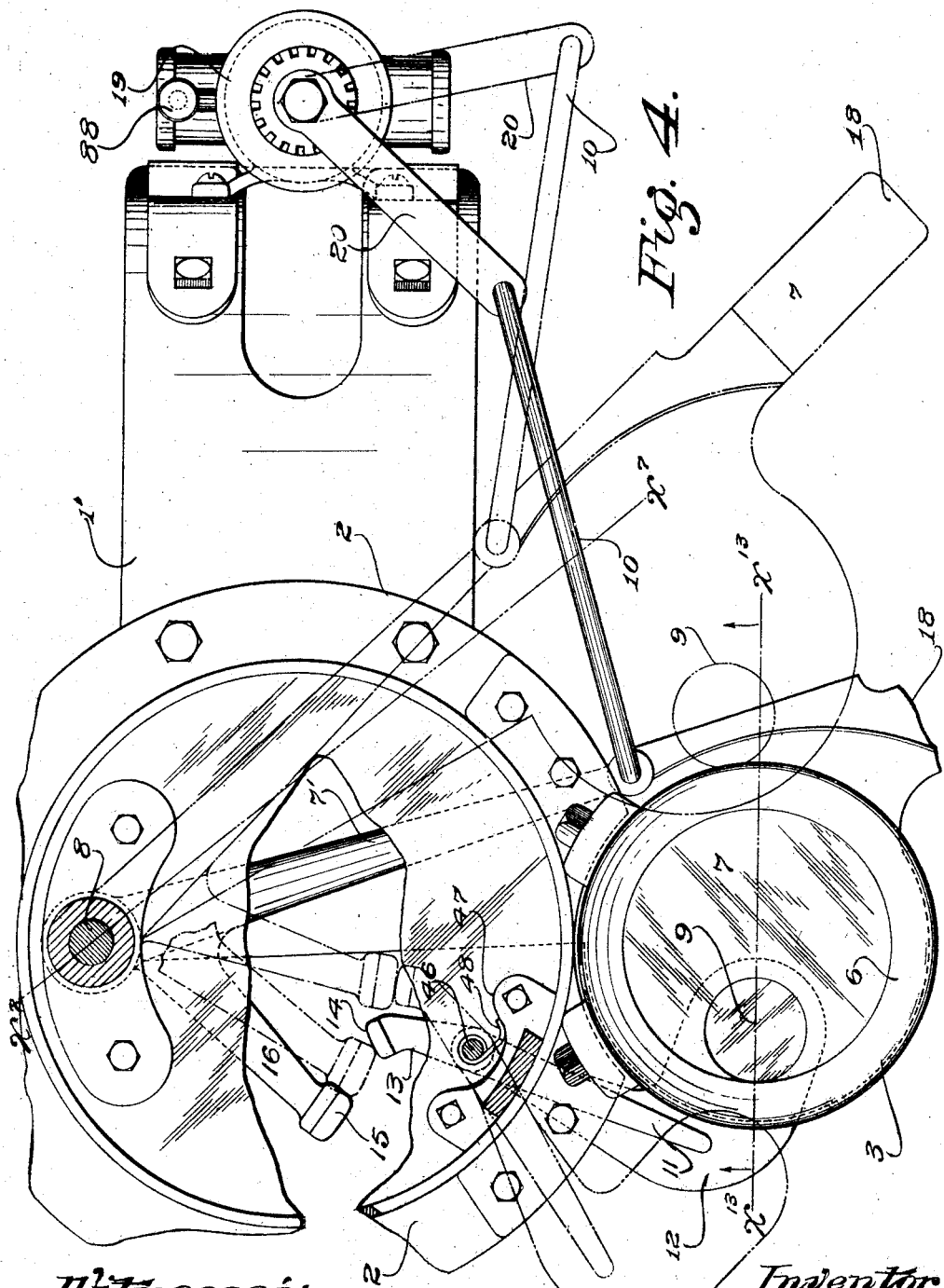

The accompanying drawings illustrate the invention:

Figure 1 is a perspective view of a weighing machine embodying the invention in one of its forms as it appears in operation with bag in place after adjustment to weigh a determined quantity of a determined material. Fig. 2 is a fragmental elevation of the lower portion of the scales partly in mid-section, omitting the bag shown in Fig. 1. Fig. 3 is a fragmentary plan of the machine shown in Fig. 1, omitting the bin and scale-beam cover, and showing the gate and cut-off in closed position. Fig. 4 is a fragmentary plan from $x^4$ Figs. 1, 7, 8, 10, and 11, showing the gate and cut-off closed, the connections between said gate and cut-off for opening the cut-off as the gate is opened, and also showing the retarding means for closing the gate. Broken lines indicate open positions of the gate and cut-off. Fig. 5 is a broken plan showing portions of the operating mechanism for controlling the gate and cut-off. The parts being shown in chute-closing position. Fig. 6 is a fragmentary plan showing the position of said mechanism when the chute is open. Fig. 7 is a fragmentary sectional elevation from line $x^7$—$x^7$, Fig. 5, showing portions of the gate operating mechanism. Fig. 8 is a detail elevation of portions of the gate and cut-off operating mechanism. Fig. 9 is a detail of one of the electro-magnetic trip mechanisms. Fig. 10 is a fragmentary perspective of the entire machine stripped of its scale beam cover and mechanism protecting cap. Fig. 11 is a fragmentary sectional elevation on line $x^{11}$—$x^{11}$, Fig. 6 looking toward the left. Fig. 12 is a detail of the binding posts and contact points. Fig. 13 is a broken longitudinal section through the conveying chute, on line $x^{13}$—$x^{13}$, Figs. 3 and 4, showing the chute closed. Fig. 14 is a fragmentary front elevation of the contact box or circuit-controlling apparatus and the scale beam. Fig. 15 is a vertical section of the same on line indicated by $x^{15}$—$x^{15}$, Figs. 14 and 16, looking in the direction of the arrows. Fig. 16 is a rear elevation of the contact box from the right of Fig. 15. Fig. 17 is a diagrammatic view of the electrical circuit for releasing the tripping devices of the slow moving gate and quick moving cut-off.

A metallic support comprising two detachable metallic legs 1, 1', a metal plate 2 bolted thereon, and a metallic beam-support 1'', is provided for the scale-beam, conveying-chute and shut-offs and the means for operating the same.

3 is a straight open-ended tube forming a conveying-chute or conduit for material to be weighed, such as sugar, meal, flour, coffee, rice, and the like, and provided with lateral or transverse slots 4 and 5 which are arranged on opposite sides of the chute at nearly the same level though in different planes. Within said chute is a funnel or secondary chute 6 tapering toward its lowest point, and terminating at a plane slightly above the uppermost slot 4.

A gate 7 is fixed to a rock-shaft or post 8 supported by and extending through the plate 2, and is designed to be operated in the chute or conduit below the plane of the plate 2 and immediately below the funnel 6 to partially close said funnel. It is provided with an opening 9 which, when the gate is closed, still allows a small stream of the material to pass through the chute into a receptacle as a sack $a$ held by a bag-holder $h$ mounted on the scales-platform b, and which, for the purposes of this description, may be designated the scale or scale-pan. Said gate is connected by rod 10 with an automatic door-check 19 to close the gate slowly at the initial rising of the scale-beam, as will be described more in detail hereinafter.

12 is a small imperforate cut-off smaller than the gate 7 and arranged reversely thereto to move in the slot 5 in the conduit 3 and to come to rest directly beneath the opening 9 in the gate 7 when it is closed, and to close such opening to finally cut off the flow of material from the funnel 6 into the sack or other receptacle below. Said cut-off 12 is fastened to a rock-shaft or post 46 by an arm 11 that projects beyond the rock-shaft 46 opposite the cut-off blade in the form of a knuckle 13 having an oblique face 14 at the end thereof to be engaged by a circular face or arc 15 on an elbow 16 that is fixed to and travels with the arm 7' of the gate 7, and which arc-face 15 will engage the oblique face 14, thus to swing the arm 13 in the same direction as the gate 7 when the gate opens, and to consequently swing the cut-off 12 in the direction reverse to that traveled by the gate; thus causing the cut-off to be retracted or opened whenever the gate is opened, leaving the cut-off free to remain open when latched, as hereinafter described, while the gate is free to close independently of the cut-off. This will be understood from Fig. 4 where engaging-arm 16 is shown in two dotted positions, the first of which represents the face 15 as just engaging the face 14, while the other dotted position shows the engagement of the two faces when both shut-offs 7 and 12 are fully open.

Face 15 is in the arc of a circle described from the axis 8, and the arms, elbow, knuckle and shut-offs are so arranged that the door-check 19 will fully close the gate 7 before the face 15 has fully passed the face 14. In the act of opening the shut-offs the face 15 will swing the knuckle around until the cut-off 12 is fully open and will slide upon the face 14 after the cut-off 12 has come to a stop at its fully open position, thus allowing the gate 7 to continue to open after the gate 12 has come to a standstill at the point where it will be latched as hereinbefore described.

The gate 7 is provided with a handle 18 and is connected with the arm 20 of an ordinary door-check 19 in order that when the open gate is released, as hereinafter described, it will be closed slowly thereby gradually relieving the flow of the material from the chute 3 and bin c, thus to prevent and rebounding of the scale-beam by reason of the sudden release of the scale from pressure caused by the momentum of the falling material.

In automatic weighing of material delivered to the scales by gravity there is always an amount of material which is in suspension at the movement of finally cutting off the stream, and the weight of which must be accurately determined before it rests on the scales, so that when it rests on the scales the total weight of material deposited will be exactly that required. To provide for accuracy in weighing under this contingency it is not uncommon to reduce the flow just before finally cutting off the stream, and in this invention improved provision is made whereby the final cut-off, upon being released, will act at a high speed to instantly shut off the final reduced flow of material to be weighed exactly at a time when the suspended material between the cut-off and the top of the material on the scale is of a predetermined weight necessary to complete the required weight of the package.

Referring further to the drawings, 21 is a scale beam; and 22, a rod which connects the scale-beam to the scale-pan or platform b, through the usual means d indicated in dotted lines in Fig. 2.

The means for controlling the operation of the gate and cut-off will now be described referring to Figs. 5 to 11 inclusive.

23 is an arm secured to said rock shaft or post 8 of the gate and provided on the end with a dog 24, pivoted thereto at e and arranged to engage a detent 25 fixed on a rock shaft or post 26 pivoted to plate 2 and bracket 27. The dog 24 is controlled by a spring 28 which is carried by arm 23 and causes engagement of said dog with the detent 25. On the gate rock shaft 8 is also mounted an elbow 29 which is in fixed relation to the arm 23 and travels with said arm as the gate is opened or closed; the gate 7, arm 23 and elbow 29 being rigidly fixed on rock shaft 8 and operated and controlled by door check 19.

30 is a knuckle and 31 a finger both fixed to the latch operating rock shaft or post 26. Finger 31 is arranged to engage in a notch 32 on the upper face of a trip latch 33, which is pivotally mounted in a frame 34 on plate 2 and is provided with a shoulder 35, (see Fig. 9), which engages and rests on an armature 36 pivoted in the frame 34 on lugs 37, by a pin 38 which has mounted intermediate thereof, a spring 56 to normally keep said armature aslant against a stop 39 in a latch engaging position to sustain said latch when the gate is open and thereby to retain the finger 31 and thus hold the latch rock-shaft or post 26 and its detent 25 from turning to release the dog 24. By this means the dog through the medium of arm 23 and post 8 holds the gate open.

The armature 36 is located in operable relation to an electro-magnet 40 which is included in a magnetic circuit (see Fig. 17), that is open except when the scale-beam rises, and which magnet when energized attracts the armature 36, thereby releasing the trip-latch 33 that thereupon falls, releasing the finger from the notch 32.

The door-check 19 which constantly tends to close the gate 7 and to turn rock-shaft 8, is restrained by dog 24 so long as the same is held by detent 25. Upon the release of the latch-trip 33 and the finger 31 held thereby, the detaining rock-shaft 26 and its detent 25 yield to the pressure of dog 24, which withdraws from the detent 25 of the rock-shaft 26 that is thereby turned about, together with its knuckle 30 that is in the path of the elbow 29 which turns with rock-shaft 8 as the gate closes, and thereupon engages the end of said knuckle 30, swings the same around, and thus turns the rock-shaft 26 to force the finger 31 back against the wall $g$ of the notch 32 of the trip-latch 33, and thus again at the closing of the gate raises the latch into a position where it will be again caught by the armature 36 that has meanwhile been released by breaking the circuit at the initial gate-closing movement, as will now be explained.

41 is a contact-base of insulating material mounted on the plate 2 and carrying spring contact points 42 and 43 which are adapted to close the circuit for the electro-magnet 40.

44 is a strip of insulation placed on one side of the contact 42 to prevent short circuiting through the contact-closing arm 45 that is attached to and moves with the lever 23 and is arranged to engage the insulation 44 of the contact-plate 42 to close the circuit at 42, 43, when the gate is open, thus to allow the circuit to be completed only when the gate is open and the scale-beam rises and operates another circuit-closer as hereinafter explained.

The electro-magnet 40 is in an electric circuit $i$ which is closed or broken by the initial movement of the scale-beam 21 the instant sufficient weight of material to break, that is, to overcome the inertia of the scale-beam is on the scale. Said magnet is energized but for an infinitesimally small period of time, since the movement of the armature 36 causes the release of the gate, as above stated, and also removes arm 45 from insulation 44 whereupon the contact-point 42 breaks contact with the contact-piect 43 thus breaking the circuit at this point until the gate is again opened.

The rock shaft or post 46 is connected rigidly with the cut-off 12 and is supported in the bracket 47 and plate 2 and is held under tension of spring 48 coiled about the post 46, the upper end of said spring bearing against a finger 49 which is fixed to the post and is adapted to engage in a slot or notch 50 of the cut-off trip latch 51 that is pivotally mounted on a bracket 52, and is provided with a shoulder not shown, but corresponding to shoulder 35 of the trip 33, and adapted to rest upon the armature 53.

The tripping arrangements for the gate and cut-off are practically alike and may be understood from Figs. 9 and 11. Referring to Fig. 11 that shows the cut-off trip latch, the lower portion of the armature 53 is rabbeted and has a pin 54 extending through the same and mounted in lug supports 55. A spring 56 is coiled about the pin 54 and normally holds said armature in its retracted or withdrawn position away from the electro-magnet 57. 58 is a post for preventing said armature from traveling too far.

59 is a base of insulating material for the contact-points 60 and 61.

62 is a block of insulation placed on the contact-plate 60 to prevent short circuiting when the finger 49 forces the plate 60 into contact with the plate 61.

The electro-magnet 57 as well as the contact-points 60 and 61 are in an electro circuit that will be finally closed by the rising scale-beam after its initial movement as hereinafter described; and when the electro-magnet 57 is energized it attracts the armature 53 and thus releases the trip-latch 51 which thereupon falls and releases the finger 49, and thereupon the cut-off is closed under the tension of the spring 48 at a time when the material in suspense, together with what has reached the scale-pan, will make up the required weight, as will be detailed hereinafter.

The successive release of the two shut-off devices,—that is to say, the gate and cut-off,—is thus automatically effected by the circuits controlled by the movement of the scale-beam when a requisite amount has been registered.

63 is a manual tripping device in the form of a bifurcation pivoted on the shaft 46 of the cut-off and carrying at its extremity two posts 64 which extend in line with the armatures 53 and 36 to simultaneously withdraw the armatures to release the trip latches to enable the attendant to close both the gate and cut-off at once in case of an emergency, as breakage of any of the parts, or failure of battery, or any other accident that might prevent release of the shut-offs by the automatic means.

63' is a cord fastened to tripping device 63 and extending through the cap $j$ that covers the operating mechanism on top of the plate 2 to operate the tripper and release the latches when the cap is in place.

By referring to Fig. 17 in connection with Figs. 3, 14, 15 and 16, the system of wiring and the electro-magnet means for successively releasing the gate and cut-off as the scale-beam rises, will be understood.

64 is a battery, and 65 a part of the circuit $i$ which is grounded; that is to say, is fastened to the support of the device as at post 65'.

66 is a metallic frame or contact box to which lever 67 is pivoted at 69. This lever extends along beneath the scale-beam 21 toward the pivot 68 thereof in position to be depressed by the scale-beam when the same is overbalanced by the poise $k$.

70 is a connection in the form of a rod extending up and down below the lever 67 to uplift said lever as the beam rises, and to be depressed by said lever as the scale-beam approaches its poise overbalanced position. Said rod is pivoted at $m$ and $n$ to two links 71 and 72, which in turn are pivoted at $o$, $p$, to the frame 66 through the medium of a bar 86 fastened to said frame by screws 87.

73 is a contact piece fastened to the conducting link 71 and thereby connected through the frame 66 with the metallic support 1″, 2 and 1 of the apparatus.

74 is a contact-piece connected by conductor $q$ with the contact-point 61 relating to electro-magnet 57 for releasing the cut-off. 75 is another contact-piece in the form of a link pivoted at 76 to the frame and adapted to contact with contact-piece 77 that is connected with conductor $r$ that leads to contact-piece 42 pertaining to the electro-magnet 40 for releasing the gate.

78 is a spring fastened to the contact-piece 75 and connected by an adjusting device 79 with the frame 66 to normally close the contact between contact pieces 75 and 77.

80 is a spring adjustably connected with the frame 66 by a lever 81 that is frictionally held in said frame and terminates in the form of a pointer 81′ to move over a graduated face 82 outside the frame by which the tension of the spring may be determined, adjustment being had by moving the pointer over the graduations. Said spring 80 is connected with one of the links 72 and exerts its tension to normally hold the connection 70 elevated to lift the lever 67 and to hold the contact-piece 73 in contact with the contact-piece 74 when the scale-beam is overbalanced by the weight on the scale-pan.

The lever 67 is adapted to depress connection 70 against the tension of spring 80 when the scale-beam 21 is held down by the poise, and the lower end of connection 70 extends into the path of the link 75 and is adapted to depress said link, thus to break the contact at 77 whenever the lever 67 is fully depressed by the scale-beam 21.

The contact-piece 75 is firmly upheld by spring 78 and is only depressed a short distance by rod 70 at the close of the downward movement of the scale-beam 21, and consequently shortly after the scale-beam 21 begins to rise the contact between 75 and 77 is caused, thereby closing the circuit from battery 64 through the ground 1, 2 and 1″ of the frame and conductor $r$ to the contact-point 42, which as hereinbefore stated, is always in contact with contact-point 43 when the gate 7 is fully open, but which springs out of contact with 43 as soon as arm 45 has been withdrawn from the insulation on 42 by the closing movement of the gate. Consequently, when the gate is open and the scale-beam 21 has risen sufficiently to cause contact between 75 and 77, the circuit $r$, $r'$, 65 and 1, will be closed, and the magnet 40 energized, thus to withdraw the armature 36 from the supporting latch, thereby allowing the gate to close.

As before stated, the closing of the gate is accomplished by a measured movement, and when the gate is closed a limited quantity of material to be weighed, still flows through the opening 9 until the continued ascent of the scale-beam 21 allows the lever 67 to rise sufficiently to enable the spring 80 to close the contact at 74; thereupon the circuit from the battery through 65, 1, 66, $q$, is completed to contact-point 61, which in case the cut-off is open will be in contact with the contact-point 60, thus completing the circuit through magnet 57 energizing the same, thus attracting the armatures 53 and releasing the cut-off latch 50 and consequently the finger 49 and cut-off 12, which under the stress of spring 48 is instantly closed, thus cutting off the stream through 9.

If the quantity of material on the scale-pan is then found to overbalance the scales, the operator will increase the tension of spring 80 by sweeping the pointer 81′ to the right along the graduated arc 82 in Fig. 14, as indicated by the lower arrow. The effect of thus increasing the tension of spring 80 is to exert more upward pressure on the scale-beam 21, thus to cause said scale-beam to rise more rapidly after it has been started to rise under tension of spring 78, spring 80, and the load on the scale-beam.

It is evident that if freely-flowing material of great specific gravity is to be weighed, the gate must begin to close at an earlier period than is the case in weighing less mobile materials of less gravity. The adjustment for the gate-closing period is accomplished by increasing or decreasing the tension of spring 78 which can be done by turning the nut 79. The spring 78 is preferably of considerable strength, as indicated in Fig. 16 so as to give greater range of adjustment to the scale-beam.

The spring 80 is lighter than spring 78 so that the force applied to assist in lifting the scale-beam to accelerate the release of the cut-off will be delicately adjustable, thus to regulate to a nicety the exact period at which the cut-off will be released after the scale-beam begins to rise. The door-check 19 is constructed with the usual means for regulating the force of said check on said gate. Said means are indicated at 88. Thus, by adjusting the tension of springs 78 and 80, and by adjusting the speed of the door-check 19, a great range of adjustment is secured.

What I claim is:—

1. In an apparatus for weighing bulk material, etc., the combination of a scale, a conveyer-chute for conveying a stream of material to the scale, a gate operable ins aid conveyer-chute for reducing the size of the stream, said gate being provided with an orifice, a cut-off operable in said chute and beneath the orifice of said gate, and means for operating said gate and cut-off at different periods.

2. The combination, with a conveyer-chute for conducting material to a weighing scale, of a gate in said conveyer-chute having an orifice, means for holding said gate open, electro-magnetic means for releasing said gate, means for controlling the speed of movement of said gate when released, a cut-off operable beneath the orifice of said gate, and means for controlling said cut-off.

3. The combination with a conduit for conducting material to a weighing scale, of a gate operable in said conduit and provided with an orifice, a cut-off also operable in said conduit arranged to move beneath the orifice of said gate, means for holding said gate and cut-off open, means for causing said gate and cut-off to travel at different speeds, and means for releasing the gate and cut-off, said means being controllable by the movement of the scale-beam.

4. The combination with a conduit for conducting material to a weighing scale, said conduit being provided with transverse slots, of a gate having an orifice and operable in one of said slots, a cut-off operable in the other of said said slots and directly beneath the orifice of said gate, means for releasing said gate and cut-off at different periods, means for regulating the speed of said gate, means for controlling said means, means for normally holding said cut-off open, both means for controlling the release of the gate and cut-off being regulable by the movement of the scale-beam.

5. The combination with a weighing scale, of a conduit having a tapering delivery chute and a plurality of transverse slots arranged on different planes, a gate extending in line with one of said slots having an orifice, a cut-off operable in said other slot and arranged to close the orifice in said gate, mechanism for holding said gate and cut-off open, electrical means for releasing said gate and cut-off, and means for causing said gate to travel at a slower speed than said cut-off.

6. The combination with a weighing scale, of a conduit for conducting material to said scale, a gate having an opening operable in said conduit, a cut-off operable beneath the opening of said gate, mechanism for holding said gate and cut-off open, an armature for controlling said mechanism, an electro-magnet, and a circuit including the electro-magnet and a circuit-closer, said circuit-closer being operated by the scale-beam.

7. The combination with a weighing scale, of a conduit for conducting material to the scale-pan, a gate operable in said conduit having an orifice, a cut-off operable in said conduit and directly beneath the orifice of said gate, said gate being provided with a handle, connections between said gate and cut-off whereby upon the opening of said gate the cut-off is caused to move in a direction reverse to that of the gate, means for holding said gate and cut-off open, electro-magnetic mechanism for releasing said gate and cut-off including two circuits each operable by the movement of the scale-beam the first for closing the gate and the second for closing the cut-off, and means for causing said gate and cut-off to travel at different speeds.

8. The combination with a weighing scale, of a conduit, a gate having an orifice operable in said conduit, a cut-off operable in said conduit and directly beneath the orifice of said gate, said gate being provided with a handle, connections between said gate and cut-off whereby upon the opening of the former the cut-off is caused to travel in a direction reverse to that of the gate, mechanism for holding said gate and cut-off open, electro-magnetic mechanism for releasing said gate and cut-off including contact points, said contact points being operable by the movement of said gate and cut-off, a source of energy, and means for making and breaking the circuit controllable by the movement of the scale-beam.

9. The combination with a weighing scale and a delivery conduit, of a gate operable in said delivery conduit, said gate having an orifice, a cut-off also operable in said conduit and arranged to close the orifice in said gate, means for holding said gate and cut-off open, means controllable by the movement of the scale-beam for releasing said gate and cut-off, and means for causing said gate to travel at a slower speed than that of said cut-off.

10. The combination with a weighing scale and a delivery conduit, of a gate operable in said conduit having an orifice, a cut-off also operable in said conduit and arranged to close said orifice of said gate, connections between said gate and cut-off whereby upon the opening of the gate the cut-off is likewise opened, latches for holding said gate and cut-off open, trips therefor, and electro-magnetic means for actuating said trips, said means being controllable by the movement of the scale-beam.

11. The combination with a weighing scale and a delivery conduit, of a gate operable in said conduit having an orifice, a cut-off also operable in said conduit and arranged to close said orifice of said gate, connections between said gate and cut-off whereby upon the opening of the gate the cut-off is likewise opened, latches for holding said gate and cut-off open, trips therefor, electro-magnetic means for actuating said trips, and means for causing said gate to travel at a speed less than that of said cut-off.

12. The combination with a weighing scale and a delivery conduit, of a gate operable in said conduit having an orifice, a cut-off also operable in said conduit and arranged to close said orifice of said gate, connections between said gate and cut-off whereby upon the opening of the gate the cut-off is likewise opened, latches for holding said gate and cut-off open, trips therefor, electro-magnetic means for actuating said trips at different periods, and a circuit-closer including said electro-magnetic means, said means being controlled by the movement of the scale-beam.

13. The combination with a conveyer-conduit for conducting material to a weighing scale, of a gate operable in said conduit having an orifice, a cut-off also operable in said conduit and arranged to close said orifice of said gate, connections between said gate and cut-off whereby upon the opening of said gate the cut-off is likewise opened, latches for holding said gate and cut-off open, armatures in operable relation to said latches for tripping the same, and electro-magnetic means for actuating said armatures, said means being controlled by the movement of the scale-beam.

14. The combination with a weighing scale, of a conduit, a gate having an orifice operable in said conduit, a cut-off operable in said conduit and directly beneath the orifice of said gate, said gate being provided with a handle, connections between said gate and cut-off whereby upon the opening of the former the cut-off is caused to travel in a direction reverse to that of the gate, fingers for holding said gate and cut-off open, latches for holding said fingers when said gate and cut-off are open, trips for said latches, and means for actuating said trips, said means being controllable by the movement of the scale-beam.

15. The combination with a weighing scale, of a conduit, a gate having an orfice operable in said conduit, a cut-off operable in said conduit and directly beneath the orifice of said gate, said gate being provided with a handle, connections between said gate and cut-off whereby upon the opening of the former the cut-off is caused to travel in a direction reverse to that of the gate, latches for holding said gate and cut-off open, armatures in operable relation to said latches, and means for actuating said armatures whereby to cause the release of said latches, said means being controllable by the movement of the scale-beam.

16. The combination with a support and a conduit attached thereto for conducting material to a weighing scale, of a gate operable in said conduit having an orifice, a pivotal support for said gate, a lever attached to said support, a dog carried by said lever and means for causing said dog to lock when said gate is opened, a latch to hold said means, a cut-off operable in said conduit and arranged to close the orifice in said gate, connection between said gate and cut-off whereby upon the opening of the gate the cut-off is likewise opened in a direction reverse to that of said gate, means for holding said cut-off open, a trip for said latch, and means for actuating said trip and releasing said cut-off at different periods, said means being controllable by the movement of the scale beam.

17. In combination with a weighing scale, a conduit and a support for said conduit, said conduit being provided with transverse slots, a gate operable in one of said slots having an orifice, a cut-off operable in the other of said slots and arranged to close the orifice in said gate, latches for holding said gate and cut-off open, electro-magnetic means for releasing said gate and cut-off at different periods, said means being regulable by movement of the scale-beam, and means for regulating the speed of travel of said gate when released.

18. The combination with a weighing scale and a delivery conduit, of a support for said conduit, a shaft extending through said support carrying a gate, said gate being provided with an orifice and arranged in operable relation with respect to said conduit, an arm and an elbow fixed to said shaft, said arm carrying a dog, a rock shaft provided with a detent for the dog, a knuckle on said rock shaft arranged in the path of movement of said elbow, a handle for opening said gate, a finger on said rock shaft, a latch to hold said finger, a trip for releasing said latch, means for actuating said trip, said finger constituting means for setting said latch and said rock shaft being operable by the contact of said elbow with said knuckle, a cut-off arranged to operate in said conduit and directly in line with the orifice of said gate, said cut-off being opened by movement of said gate, and means for actuating said cut-off at a time different from that of the gate, said means being controllable by the movement of the scale-beam.

19. The combination with a conduit for conducting material to a weighing scale, said conduit being provided with lateral slots, of a gate having a handle and operable in one of said slots, said gate being provided with an aperture, a cut-off operable in the other of said slots and directly beneath said aperture, latch means for controlling said gate and cut-off, electro-magnetic means for tripping said latch means, including circuit closers and breakers, controllable by the movement of the scale-beam.

20. The combination with a support, a weighing scale and a conduit carried by said support for conveying material to the scale, of a shaft extending through said support, a gate connected to said shaft, an arm carried by said shaft, a dog pivoted to the end of the arm, an elbow mounted on said shaft, a second shaft mounted in said support having a latch finger, a latch for said finger, a knuckle fixed to said second shaft in the path of the elbow for actuating said latch finger, and means for holding the latch in latching position, the same controllable by the movement of the scale-beam for releasing the latch.

21. The combination with a weighing scale and a delivery conduit for conducting material to the scale, of a gate operable in said conduit, said gate having an orifice, a cut-off also operable in said conduit and arranged to close said orifice in said gate, latch means for holding said gate and cut-off open, means for tripping said latch means, and means for automatically resetting said latch means preparatory to the next operation.

22. The combination with a weighing scale and a delivery conduit for conducting material to the scale, of a gate operable in said conduit, said gate having an orifice, a cut-off also operable in said conduit and arranged to close said orifice in said gate, latch means for holding said gate and cut-off open, means for tripping said latch means, and automatic means controllable by the closing movement of the gate for resetting said latch means.

23. The combination with a weighing scale and a delivery conduit for conducting material to the scale, of a gate operable in said conduit, said gate having an orifice, a cut-off also operable in said conduit and arranged to close said orifice in said gate, latch means for holding said gate and cut-off open, means for tripping said latch means whereby to cause said gate and cut-off to close at different periods, said means being controllable by the movement of the scale-beam, and automatic means for setting the latch mechanism for said gate.

24. The combination with a weighing scale and a delivery conduit for conducting material to the scale, of a gate operable in said conduit, said gate having an orifice, a cut-off also operable in said conduit and arranged to close said orifice in said gate, latch means for holding said gate and cut-off open, means for tripping said latch means whereby to cause said gate and cut-off to close at different periods, said means being controllable by the movement of the scale-beam, and automatic means for setting the latch mechanism for said gate before said gate has completed its movement.

25. The combination with a weighing scale and a conduit for conducting material to the scale, of a gate operable in said conduit having an orifice, a cut-off also operable in said conduit and directly beneath said orifice, latch mechanism for holding said gate normally open, means for tripping said latch mechanism whereby the gate is caused to close, and means carried by said gate for resetting said latch mechanism before completion of the closure of said gate in said conduit.

26. The combination with a weighing scale, a frame and a conduit carried by said frame for conducting material to the scale, of a shaft extending through said frame, a gate fixed to said shaft below the surface of said frame, an arm having a dog and an elbow mounted on said shaft and above the surface of said frame, said elbow and arm being disposed at different angles, a second shaft mounted in said frame carrying a latch finger and a knuckle, said shaft being provided with a detent and arranged to be engaged by said dog, a latch for said latch finger, and means for tripping said latch whereby said gate is caused to close, said means being controllable by the movement of the scale-beam.

27. The combination with a frame, a scale and a conduit mounted on said frame, of a shaft extending through said frame, a gate fixed to said shaft, said gate being arranged to operate in said conduit, a cut-off also operable in said conduit, connections between said cut-off and gate whereby upon the opening of said gate the cut-off is also opened, said gate being located below the surface of said frame, an arm carried by said shaft having a dog, a second shaft mounted in said frame having a latch-finger and a knuckle, and provided with a detent, said dog being arranged to engage said detent, a latch for said latch finger, means for releasing said latch, said means being controllable by the movement of the scale-beam, and means for resetting said latch finger preparatory to the next operation comprising an elbow carried by the said first-named shaft, said elbow being arranged to engage said knuckle mounted on said second shaft to reset said latch mechanism before the complete closing of said gate.

28. The combination with a support and a conduit attached thereto for conducting material to a weighing scale, of a gate operable in said conduit having an orifice, a pivotal support for said gate, an arm attached to said support, a dog mounted on one end of the same, means for causing said dog to lock when said gate is opened, said means comprising a shaft having a detent, a latch finger and an arm, a latch for said latch finger, means carried by said pivotal support for engaging said arm when the latch is tripped, a cut-off operable in said conduit and arranged to close the orifice in said gate, connection between said gate and cut-off whereby upon the opening of the gate the cut-off is likewise opened in a direction reverse to that of said gate, means for holding said cut-off open, means for actuating said gate and cut-off at different periods, said means being controllable by the movement of the scale-beam, and means for causing said gate to travel at a slower speed than said cut-off.

29. The combination with a weighing-scale, a conduit and a support for said conduit, said conduit being provided with transverse slots, of a gate operable in one of said slots having an orifice, a cut-off operable in the other of said slots and arranged to close the orifice in said gate, a pivotal support for said cut-off, connections between said cut-off and gate whereby upon the opening movement of the gate the cut-off is likewise opened in a direction reverse to that of the gate, a check attached to said gate, means for holding said gate and cut-off open, means for releasing said gate and cut-off at different periods, said means being controllable by the movement of the scale-beam, and means for regulating the force of said check on said gate.

30. A weighing machine provided with a gate and a cut-off arranged to successively operate to close the passage to the scale-pan, means for temporarily holding the gate and the cut-off in open position, an electro-magnet to operate each of said means to successively release the gate and the cut-off, a source of electrical energy for said magnets, two circuit closers, one for each of said magnets, and means for operating said circuit closers, said means being adapted to uplift the scale-beam and to successively close the circuits for the magnets respectively as the scale-beam is uplifted.

31. In an electro-magnetic automatic weighing machine, a scale, a gate to partially close the passage to the scale-pan, a cut-off to complete the closing of said passage, a latch for controlling the gate, an armature to hold the latch, a magnet to release said armature from the latch, a latch for controlling the cut-off, an armature to hold such latch, a magnet to release said armature from the latch, an electric circuit connecting the magnets with a source of electrical energy, said source, a lever to lift the scale-beam, a spring to uplift the lever, a contact-point operable by said spring to make contact to close the circuit through the electro-magnet for releasing the gate, another spring to uplift the lever, and a contact-point operable by said other spring to close the circuit for the electro-magnet for releasing the cut-off.

32. In an electro-magnetic automatic weighing machine, a scale, a gate to partially close the passage to the scale-pan, a cut-off to complete the closing of said passage, a latch for controlling the gate, an armature to hold the latch, a magnet to release said armature from the latch, a latch for controlling the cut-off, an armature to hold such latch, a magnet to release said armature from the latch, an electric circuit connecting the magnets with a source of electrical energy, said source, a lever to lift the scale-beam, a spring to uplift the lever, a contact-point operable by said spring to make contact to close the circuit through the electro-magnet for releasing the gate, another spring to uplift the lever, a contact-point operable by said other spring to close the circuit for the electro-magnet for releasing the cut-off, and means for adjusting the tensions of the springs.

33. A weighing machine having two shut-offs and beam-lifting devices for successive operation of such shut-offs, independent latching means for said shut-offs, independent electrical means for controlling said latching means, said electrical means being regulable by the change of position of the beam-lifting devices.

34. The combination with a scales, of two beam-lifting devices and two shut-off devices, and means in relation therewith whereby the closing of the shut-off devices is successively effected by change of position of the beam-lifting devices.

35. The combination with a scales, of a delivery chute, a beam-lifting device, a stop for the same, a gate, means for slowly closing the gate upon the stopping of said device, a second beam-lifting device, a stop for the same, a final cut-off, and means for suddenly closing the cut-off upon the stopping of the second beam-lifting device.

36. The combination with a scales and a chute, of two beam-lifting devices, means for stopping said devices successively, and shut-off means for the chute whereby a partial closing of the chute will be effected upon the stopping of one of said beam-lifting devices, and a partial closing of the chute will be effected at the stopping of the other of said devices.

37. An automatic weighing machine provided with two shut-offs, electro-magnetic means operable by the uplifting of the scale-beam to release said shut-offs successively, included in a common circuit, and manual means for closing the circuit and simultaneously releasing the shut-offs.

38. An automatic weighing machine provided with a gate and a cut-off for partially and fully cutting off the delivery chute, a door-check for slowly closing the gate, and means for suddenly closing the cut-off.

39. The combination with a scales and a chute, of a gate and a cut-off for partially and completely closing said chute, means for holding the gate open, means for holding the cut-off open, an electro-magnet for releasing the gate, an electro-magnet for releasing the cut-off, a lever extending along beneath the scale-beam, a connection extending up and down beneath the lever to uplift said lever and to be depressed thereby, pivoted links supporting said connection and connecting with a contact-point to close the circuit for the cut-off, a link having a limited movement to operate said connection and provided with a contact point to close the circuit for the magnet that releases the gate, a spring to operate the last-named link, and a spring to operate the first-named link.

40. The combination with a scales and a chute, of a cut-off for partially and completely closing said chute, means for holding the gate open, means for holding the cut-off open, an electro-magnet for releasing the gate, an electro-magnet for releasing the cut-off, a lever extending along beneath the scale-beam, a connection extending up and down beneath the scale-beam and lever to uplift said lever and to be depressed thereby, pivoted links supporting said connection and connecting with a contact-point to close the circuit for the magnet that releases the gate, a spring to operate the last-named link, a spring to operate the first-named link, and means for regulating the tension of said springs.

41. The combination with a scales and a chute, of a gate and a cut-off for partially and completely closing said chute, means for holding the gate open, means for holding the cut-off open, an electro-magnet for releasing the gate, an electro-magnet for releasing the cut-off, a lever extending along beneath the scale-beam to assist in lifting the same and to be depressed thereby, a connection extending up and down beneath the lever to uplift said lever and to be depressed thereby, pivoted links supporting said connection and connected with a contact point to close the circuit for the gate-releasing magnet, a link disconnected from and adapted to lift said connection, a spring to operate the last-named link, a spring to operate the first-named link, means for adjusting the tension of the link for closing the circuit for the electro-magnet of the gate, a graduated arc and a lever connected with the spring that controls the links pivoted to said connection, said lever being provided with a pointer to sweep over said graduated arc.

42. An automatic weighing machine provided with a spring for uplifting the scale-beam and for closing a circuit to operate a cut-off, a graduated arc-scale, and a lever connected with said spring to frictionally hold against the tension thereof and provided with a pointer to sweep over said graduated arc.

43. In a weighing machine having a chute, the combination of a gate and a cut-off pivoted to coöperate in closing the chute, the radius of the cut-off being shorter than that of the gate, and means for releasable connection between the gate and cut-off to retract the cut-off when the gate is open and to leave the gate free to close independently of the cut-off.

44. In a weighing machine having a chute, the combination of a gate and a cut-off pivoted to coöperate in closing the chute, means for closing the gate, means for closing the cut-off, an elbow rigidly connected with the gate and a knuckle rigidly connected with the cut-off and extending in the way of the elbow to be operated thereby to open the cut-off when the gate is opened and leaving the gate free to close independently of the cut-off.

45. In a weighing machine a tube provided on opposite sides with transverse slots, a gate in one of said slots having an orifice, a cutoff in the other of said slots to close said orifice and a funnel in the tube terminating immediately above the gate.

46. In a weighing machine, a scale, a receptacle on said scale, an open ended tube above said receptacle and provided on opposite sides with transverse slots, a gate provided with an orifice in one of said slots, a cutoff in the other slot to close said orifice, a funnel in said tube terminating just above said gate, means for withdrawing said cut-off in the gate from beneath the funnel and means operable by the movement of the scale beam for successively bringing the gate and the cut-off beneath said funnel to close the same.

47. In a weighing machine a funnel, a tube extending below the funnel of larger diameter than the funnel, a gate having an orifice and adapted to close the space below the funnel, except at the orifice, and a cut-off beneath the gate to close the orifice.

48. In a weighing machine, the combination with a chute, of two shut-offs therefor, a knuckle fixed to one of said shut-offs, and an elbow fixed to another of said shut-offs, said elbow being adapted to engage said knuckle at the opening movement of the shut-off to which it is connected, thereby to effect the opening of the other shut-off.

49. In a weighing machine, the combination with a chute, of two shut-offs therefor, a knuckle fixed to one of said shut-offs and an elbow fixed to another of said shut-offs, said elbow being adapted to engage said knuckle at the opening movement of the shut-off to which it is connected, thereby to effect the opening of the other shut-off, the contacting face of the elbow being in an arc of a circle and the contacting face of the knuckle being oblique to the path of said face of the elbow when the shut-off connected with the knuckle is closed, and being adapted to move into position tangent to the face of said elbow when the shut-offs are fully open.

In testimony whereof, I have hereunto set my hand at Los Angeles California this 16th day of January 1907.

CHARLES L. BOND.

In presence of—
 JAMES R. TOWNSEND,
 M. BEULAH TOWNSEND.